UNITED STATES PATENT OFFICE.

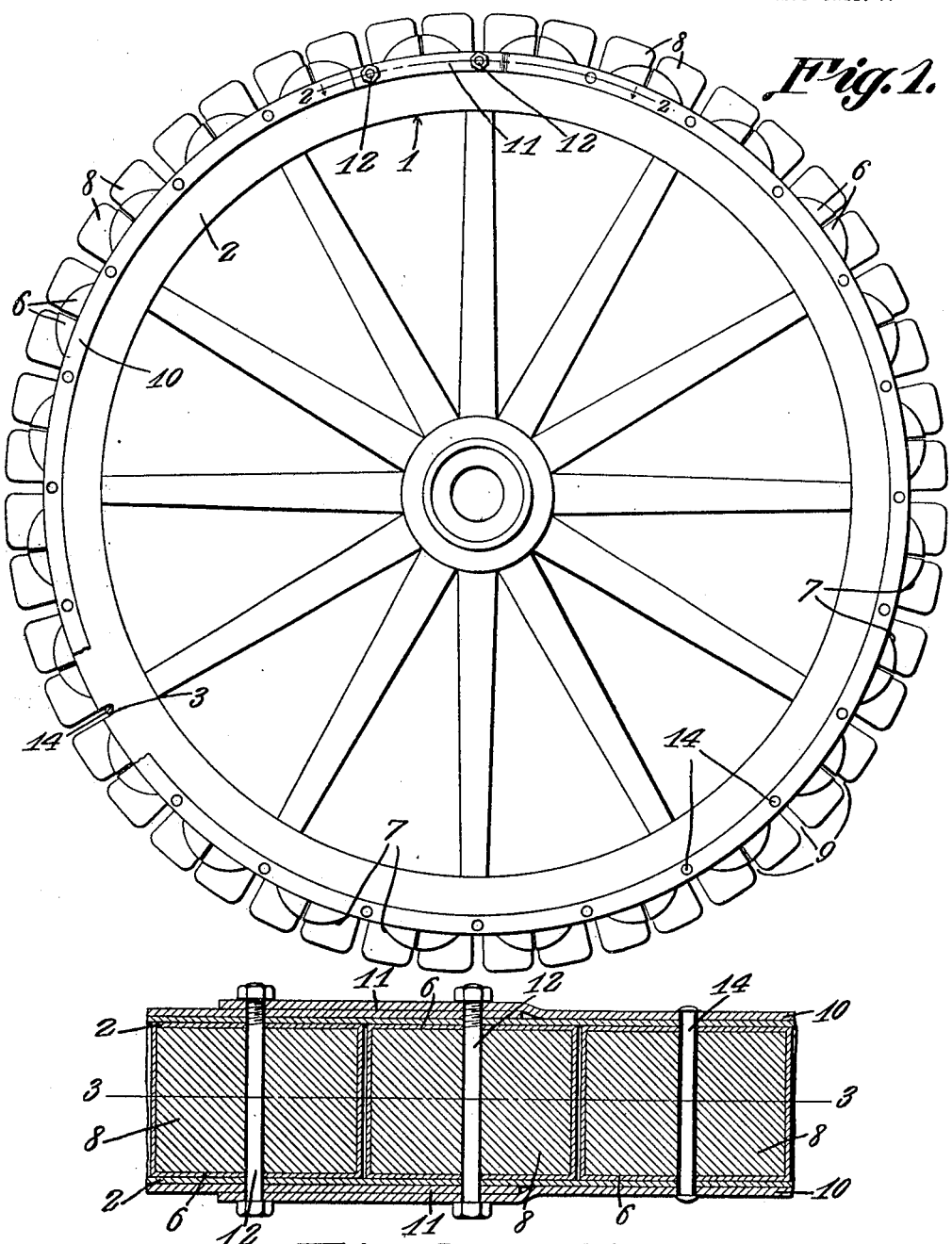

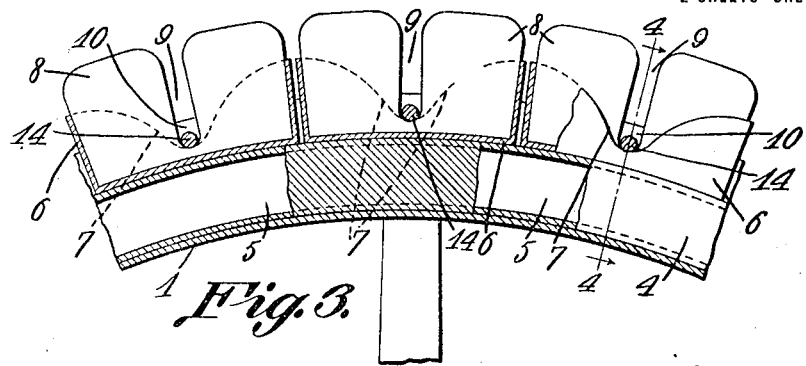
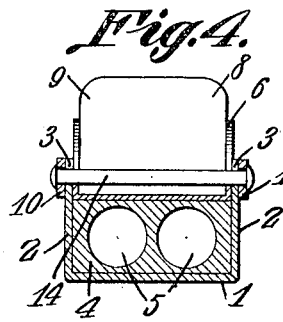
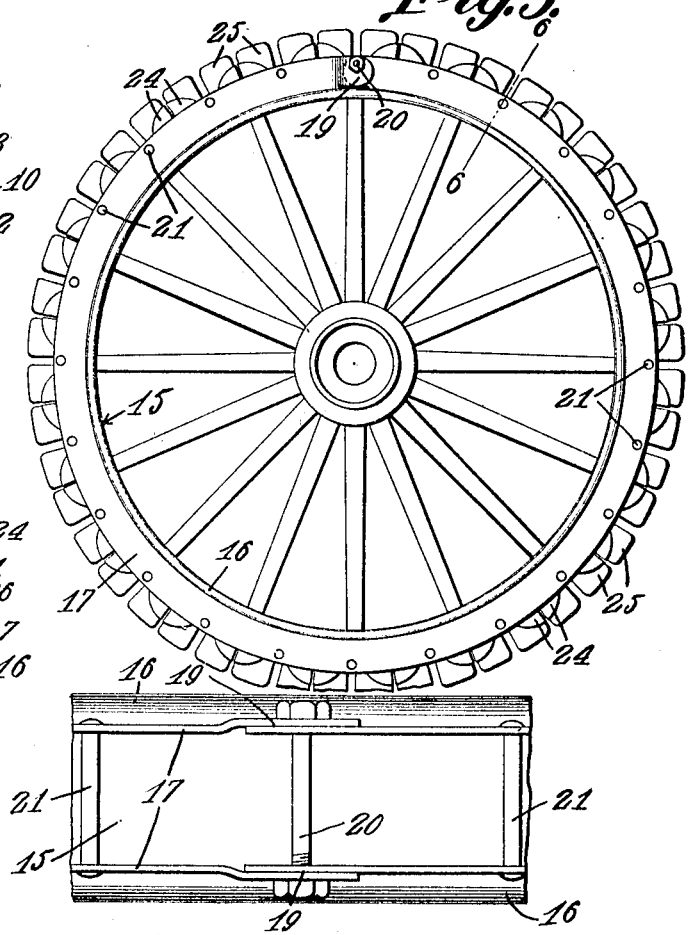
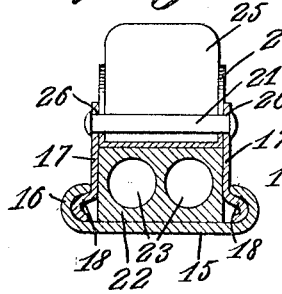
F. B. Pfeiffer, Inventor

FRED BROWN PFEIFFER, OF AKRON, OHIO.

TIRE.

1,206,909.  Specification of Letters Patent.  Patented Dec. 5, 1916.

Application filed February 15, 1916. Serial No. 78,451.

*To all whom it may concern:*

Be it known that I, FRED B. PFEIFFER, a citizen of the United States, residing at Akron, in the county of Summit and State of Ohio, have invented a new and useful Tire, of which the following is a specification.

The device forming the subject matter of this application is a tire, and the invention aims to provide a device of this type in which pneumatic elements subject to puncture and deterioration may be dispensed with.

Another object of the invention is to provide a tread block of novel and improved form, and to provide improved means whereby the tread block is assembled with the rim.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows in side elevation, a wheel constructed in accordance with the present invention, parts being broken away; Fig. 2 is a fragmental section taken on the line 2—2 of Fig. 1; Fig. 3 is a section taken on the line 3—3 of Fig. 2; Fig. 4 is a cross section taken on the line 4—4 of Fig. 3; Fig. 5 is a side elevation showing a modified form of the invention; Fig. 6 is a cross section taken on the line 6—6 of Fig. 5; Fig. 7 is a fragmental bottom plan showing a portion of the rim constituting a part of that form of the invention disclosed in Figs. 5 and 6.

In carrying out the invention as shown in Figs. 1 to 4 both inclusive, there is provided a channel-shaped rim 1 preferably made of metal and embodying side walls 2, the outer edges of which are provided with notches 3. Circumscribing the rim 1 and located between the side walls 2 and supported by the base portion of the rim 1 is a cushion 4 which may be made of rubber or other resilient material, the cushion 4 having longitudinal chambers 5 therein.

Resting on the cushion 4 between the side walls 2 are metal casings 6 of cup-shape, the casings 6 having depressions 7 in their side walls. Located in each of the casings 6 is a tread block 8 made of any desired material having the necessary wearing qualities and, if desired, possessing some resiliency. The tread blocks 8 are provided with transverse grooves 9.

Applied to the outer faces of the side walls 2 of the rim 1 are side plates 10 of annular form, the ends of each side plate being overlapped as shown at 11. The overlapped ends 11 of the side plates 10 are connected by cross bars 12 which preferably are bolts, to facilitate a connecting of the ends of the side plates. At intervals, the side plates 10 are connected by other cross bars 14, which may be rivets, or be of any other desired form. The cross bars 12 and 14 are received in the notches 3 which are formed in the side walls 2 of the rim 1. The cross bars 12 and 14 pass through the depressions 7 in the sides of the casing 6, and pass through the notches in the grooves 9 in the tread blocks 8. A circumferential strain is carried into the side walls 2 of the rim 1, owing to the fact that the cross bars 12 and 14 are lodged in the notches 3. Further, owing to the fact that the cross bars 12 and 14 are lodged in the grooves or notches 9 of the tread blocks 8, relative circumferential movement between the tread blocks and the casings 6 is prevented.

In Figs. 5, 6 and 7 of the drawings, a modified form of the invention has been shown. In the form under consideration, the rim of the wheel embodies a base plate 15 provided with clencher flanges 16 adapted to coöperate with beads 18 on the side plates 17 constituting a part of the rim. The ends of the side plates 17, which are of annular form, are overlapped as shown at 19 and are connected by a cross bar in the form of a bolt 20. At intervals, the side plates 17 are connected by cross bars 21 which may be rivets if desired. The cushion appears at 22 and is provided with chambers 23. The casings are shown at 24 and hold the tread blocks 25. Openings 26 in the side plates 17 receive the cross bars 20 and 21. The cross bars 20 and 21 coact with the tread blocks, with the casings and with the side plates 17 in the manner hereinbefore set forth in connection with the preferred form of the invention, and a detailed description of the operation of the modification above described is considered unnecessary.

Having thus described the invention, what is claimed is:—

1. In a device of the class described, a rim embodying side walls having openings in their outer edges; a cushion carried by the rim; tread blocks supported by the cushion and provided with notches; side plates coacting with the rim; and cross bars carried by the side plates, the cross bars being lodged in the notches and in the openings.

2. In a device of the class described, a rim; a cushion carried by the rim; cup-shaped casings carried by the cushion and provided with depressions in its side walls; tread blocks located in the casings and provided with notches; and cross bars engaged in the notches and in the depressions and assembled terminally with the rim.

3. In a device of the class described, a rim; a cushion carried by the rim; cup-shaped casings supported on the cushion and provided with depressions in their side walls; tread blocks located in the casings and provided with notches; side plates applied to the rim; and cross bars connecting the side plates, the cross bars being lodged in the depressions and in the notches, and the rim having peripheral notches in which the cross bars are received.

In testimony that I claim the foregoing as my own, I have hereto affixed my signature in the presence of two witnesses.

FRED BROWN PFEIFFER.

Witnesses:
 Mrs. F. B. Pfeiffer,
 Mrs. C. A. Pfeiffer.

Copies of this patent may be obtained for five cents each, by addressing the "Commissioner of Patents Washington, D. C."